United States Patent
Honzawa

(10) Patent No.: US 11,592,095 B2
(45) Date of Patent: Feb. 28, 2023

(54) DRIVING DEVICE

(71) Applicant: SEIKO EPSON CORPORATION, Tokyo (JP)

(72) Inventor: Taketo Honzawa, Tomi (JP)

(73) Assignee: SEIKO EPSON CORPORATION, Tokyo (JP)

(*) Notice: Subject to any disclaimer, the term of this patent is extended or adjusted under 35 U.S.C. 154(b) by 57 days.

(21) Appl. No.: 17/105,522

(22) Filed: Nov. 26, 2020

(65) Prior Publication Data

US 2021/0164554 A1     Jun. 3, 2021

(51) Int. Cl.
| | |
|---|---|
| *F16H 37/02* | (2006.01) |
| *F16H 49/00* | (2006.01) |
| *B25J 9/10* | (2006.01) |
| *B25J 9/04* | (2006.01) |

(52) U.S. Cl.
CPC ............ *F16H 49/001* (2013.01); *B25J 9/108* (2013.01); *B25J 9/1025* (2013.01); *B25J 9/042* (2013.01)

(58) Field of Classification Search
CPC .............................. F16H 49/001; B25J 9/1025
USPC ................................................ 74/421 A, 640
See application file for complete search history.

(56) References Cited

U.S. PATENT DOCUMENTS

| | | | | |
|---|---|---|---|---|
| 5,295,413 | A * | 3/1994 | Sherman ................. | B60K 1/00 74/421 A |
| 6,893,371 | B2 * | 5/2005 | Mills ....................... | F16H 61/32 475/149 |
| 2002/0135241 | A1 * | 9/2002 | Kobayashi ............. | H02K 7/083 310/20 |
| 2008/0026901 | A1 * | 1/2008 | Kiyosawa ................ | F16H 3/70 475/325 |

FOREIGN PATENT DOCUMENTS

JP        H10291185 A     11/1998

* cited by examiner

*Primary Examiner* — William C Joyce
(74) *Attorney, Agent, or Firm* — Yu Gang

(57) ABSTRACT

A first driving device includes a motor including a rotating shaft, a speed reducer, and a supporting member. The speed reducer includes a rigid gear, a flexible gear configured to partially mesh with the rigid gear, and a wave motion generator coupled to the rotating shaft and configured to come into contact with the inner circumferential surface of the flexible gear, bend the flexible gear, and move a meshing position of the rigid gear and the flexible gear in the circumferential direction. The wave motion generator includes a projecting section projecting along the rotating shaft. The rotating shaft is supported by the supporting member via a bearing including an inner ring and an outer ring. The outer ring of the bearing is supported by the supporting member. The rotating shaft and the projecting section are coupled to the inner ring of the bearing by tight fitting.

4 Claims, 4 Drawing Sheets

DRIVING DEVICE

The present application is based on, and claims priority from JP Application Serial Number 2019-215075, filed Nov. 28, 2019, the disclosure of which is hereby incorporated by reference herein in its entirety.

BACKGROUND

1. Technical Field

The present disclosure relates to a driving device.

2. Related Art

As a driving device of an industrial robot or the like, for example, as described in WO 2018/055752 (Patent Literature 1), there has been publicly known a structure including a motor including a rotating shaft, a speed reducer, and a supporting member for coupling these two components and fixing the components to a housing of a robot.

As the speed reducer, a wave gear speed reducer that is small in size and light in weight and is capable of achieving a high reduction ratio is sometimes adopted. The wave gear speed reducer includes three components, that is, an internal gear fixed to a supporting member, a flexible external gear that partially meshes with the internal gear, and a wave motion generator that is coupled to a rotating shaft of a motor, comes into contact with the inner circumferential surface of the external gear, bends the external gear, and moves a meshing position of the internal gear and the external gear in the circumferential direction. In the driving device described in Patent Literature 1, in the coupling of the rotating shaft of the motor and the wave motion generator of the wave gear speed reducer, usually, the rotating shaft and a fitting hole of the wave motion generator are loose-fit in order to prevent deformation of the wave motion generator.

However, in the case of the loose fitting, it is difficult to secure coaxial accuracy of the wave motion generator with respect to the rotating shaft because of a gap in the radial direction. The mechanical life of the speed reducer is reduced.

SUMMARY

A driving device includes: a motor including a rotating shaft; a wave gear speed reducer configured to reduce speed of rotation of the rotating shaft; and a supporting member configured to support the motor and the wave gear speed reducer. The wave gear speed reducer includes: an internal gear fixed to the supporting member; a flexible external gear configured to partially mesh with the internal gear; and a wave motion generator coupled to the rotating shaft and configured to come into contact with an inner circumferential surface of the external gear, bend the external gear, and move a meshing position of the internal gear and the external gear in a circumferential direction. The wave motion generator includes a projecting section projecting along the rotating shaft. The rotating shaft is supported by the supporting member via a bearing including an inner ring and an outer ring. The outer ring of the bearing is supported by the supporting member. The inner ring of the bearing and the rotating shaft are coupled by tight fitting. The inner ring of the bearing and the projecting section are coupled by tight fitting.

In the driving device, a first supporting section for supporting the bearing and a second supporting section for fixing the internal gear may be integrally configured by one component in the supporting member.

In the driving device, the first supporting section, the second supporting section, and a third supporting section attached to an external housing may be integrally configured by one component in the supporting member.

In the driving device, a distal end of the projecting section may be in contact with the rotating shaft at an inner side of the inner ring of the bearing.

In the driving device, the projecting section may include, at an outer side of a portion coupled to the bearing, a thick section, thickness of which in a direction perpendicular to the rotating shaft is larger than thickness of a portion coupled to the bearing.

In the driving device, the thick section may be in contact with the bearing.

DESCRIPTION OF EXEMPLARY EMBODIMENTS

A driving device according to an embodiment is explained in detail below.

Robot

First, a robot according to this embodiment is explained.

Figure 1:
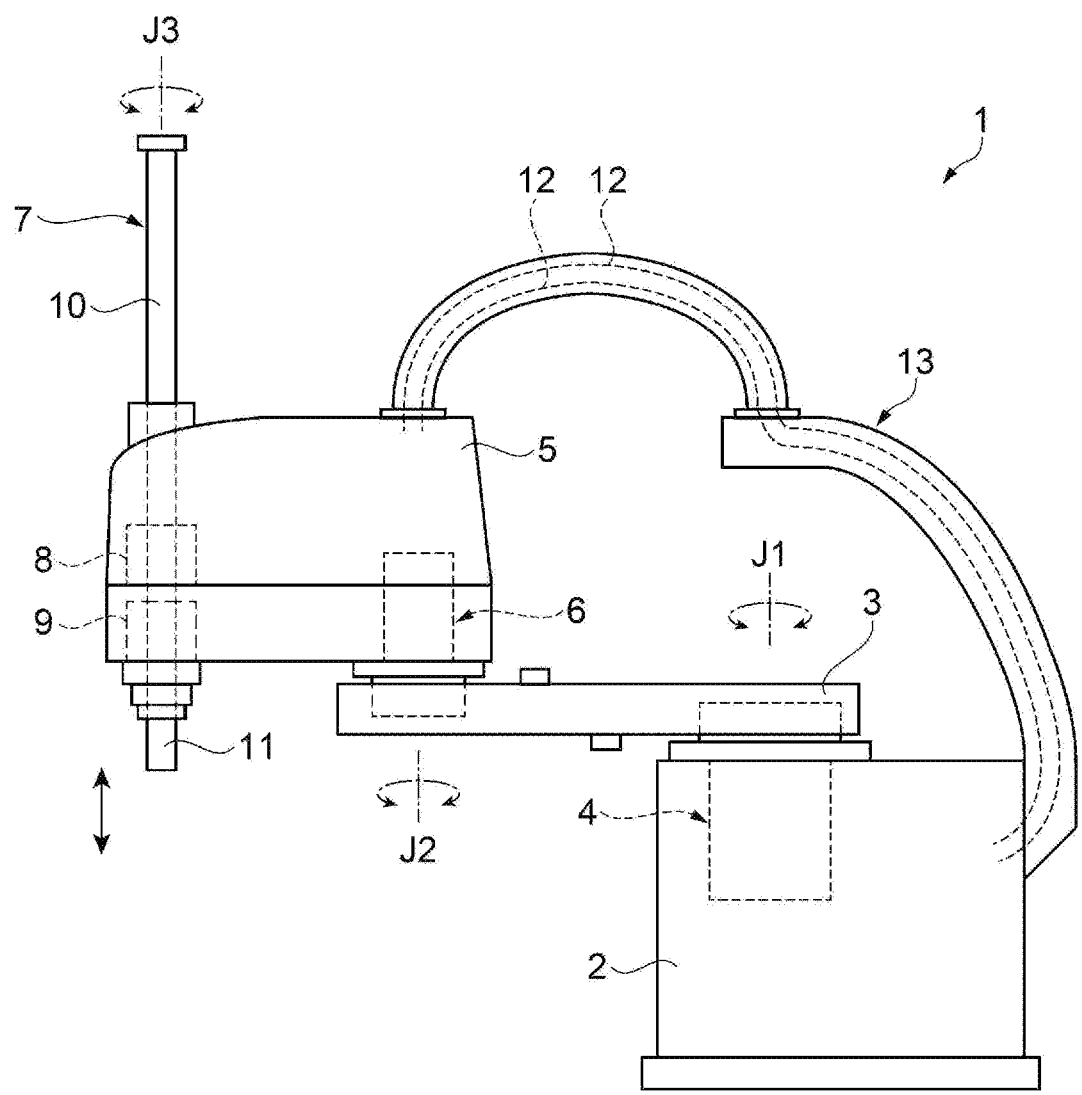
FIG. 1 is a diagram showing a schematic configuration of a robot according to an embodiment.
Figure 1:
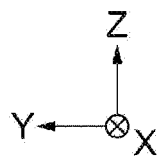

A robot 1 shown in FIG. 1 is a SCARA (Selective Compliance Assembly Robot Arm) robot (a horizontal articulated robot).

The robot 1 can perform work such as supply, removal, conveyance, and assembly of a precision instrument and components configuring the precision instrument. In the following explanation, an XYZ coordinate system is set and a positional relation among members is explained with reference to the XYZ coordinate system. In the explanation, the vertical direction is represented as a Z-axis direction, the horizontal direction, which is the length direction of a base 2, is represented as a Y-axis direction, and the horizontal direction, which is the width direction of the base 2, is represented as an X-axis direction.

The robot 1 includes the base 2, a first arm 3, and a first driving device 4.

The base 2 is a portion for attaching the robot 1 to any setting place. The base 2 is fixed to, for example, a not-shown floor surface by bolts and the like. A setting place of the base 2 is not particularly limited. Examples of the setting place include a floor, a wall, a ceiling, and a movable truck.

The first arm 3 is coupled to the upper end portion of the base 2 via the first driving device 4 mounted on the base 2. The first arm 3 is capable of turning around a first axis J1, which is along the vertical direction (the Z-axis direction), with respect to the base 2.

The robot 1 includes a second arm 5 and a second driving device 6.

The second arm 5 is coupled to the distal end portion of the first arm 3 via the second driving device 6 mounted on the second arm 5. The second arm 5 is capable of turning around a second axis J2, which is along the vertical direction (the Z-axis direction), with respect to the third arm 3.

A work head 7 is disposed at the distal end portion of the second arm 5. The work head 7 includes a spline nut 8 and a ball screw nut 9 coaxially disposed at the distal end portion of the second arm 5 and a spline shaft 10 inserted through the spline nut 8 and the ball screw nut 9. The spline shaft 10 is capable of rotating around a third axis J3, which is along the vertical direction (the Z-axis direction), with respect to the second arm 5 and is capable of moving (rising and falling) in the up-down direction.

A not-shown end effector is coupled to a distal end portion (a lower end portion) 11 of the spline shaft 10. The end effector is not particularly limited. Examples of the end effector include an end effector that grips a conveyed object and an end effector that machines a workpiece.

A plurality of wires 12 coupled to electronic components (for example, the second driving device 6) disposed in the second arm 5 are drawn around to the inside of the base 2 passing through a tubular wire drawing-around section 13 that couples the second arm 5 and the base 2. Further, the plurality of wires 12 are gathered in the base 2 to be drawn around to, together with a wire coupled to the first driving device 4, a not-shown control device that is set on the outside of the base 2 and collectively controls the robot 1. Driving of the first driving device 4 and the second driving device 6 is controlled by the control device.

In such a robot 1, the first driving device 4 transmits a driving force for turning the first arm 3 with respect to the base 2 from the base 2 side to the first arm 3 side. The second driving device 6 transmits a driving force for turning the second arm 5 with respect to the first arm 3 from the second arm 5 side to the first arm 3 side. "Turning" has a meaning including moving in both directions including one direction and the opposite direction of the one direction with respect to a certain center point and rotating with respect to the certain center point.

Driving Device

The driving device according to this embodiment is explained below. The first driving device 4 and the second driving device 6 functioning as the driving device have the same configuration. Therefore, in the following explanation, only the first driving device 4 is explained.

Figure 2:
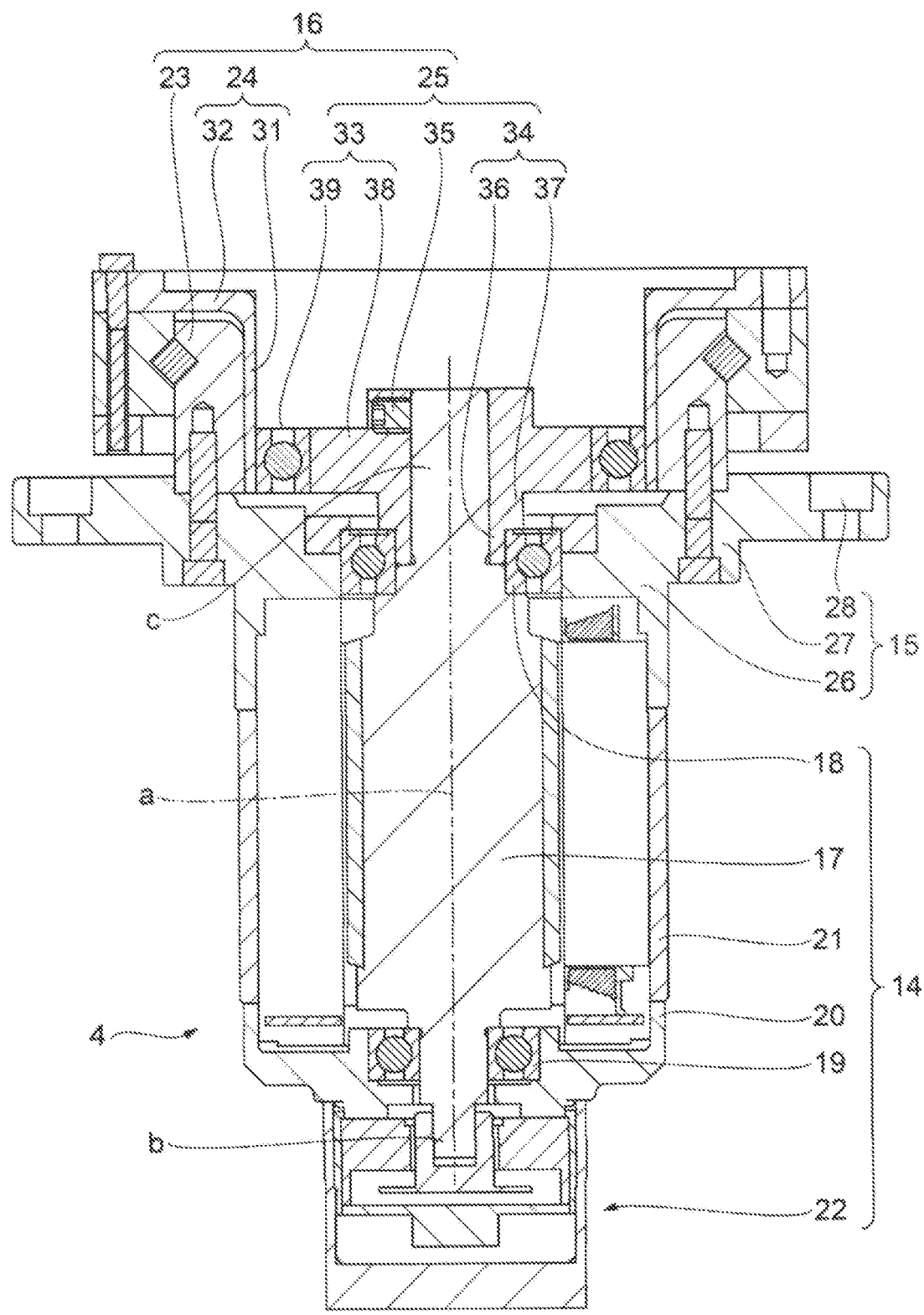
FIG. 2 is a sectional view showing a first driving device according to the embodiment.
Figure 3:
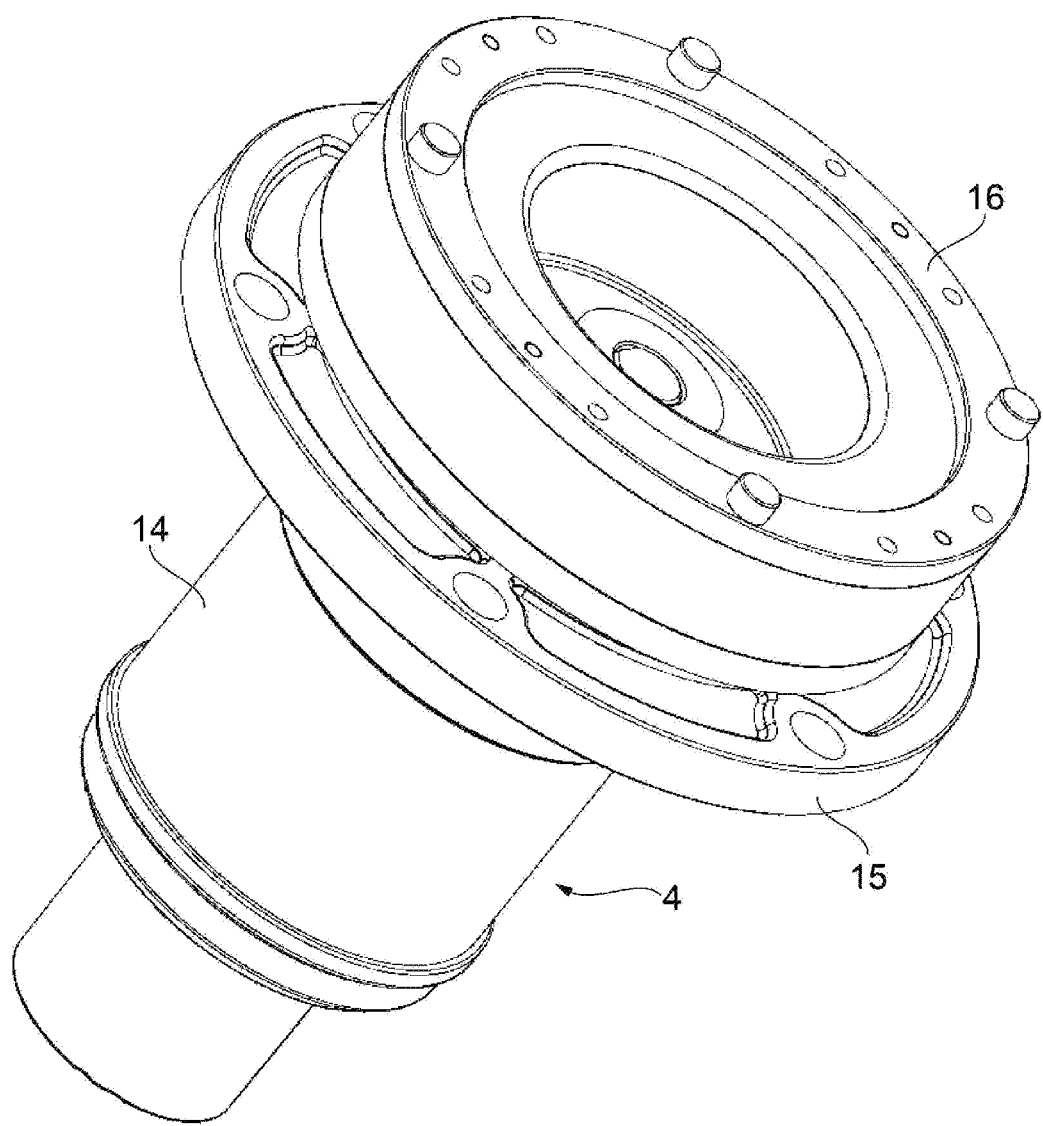
FIG. 3 is a perspective view showing the first driving device according to the embodiment.
Figure 4:
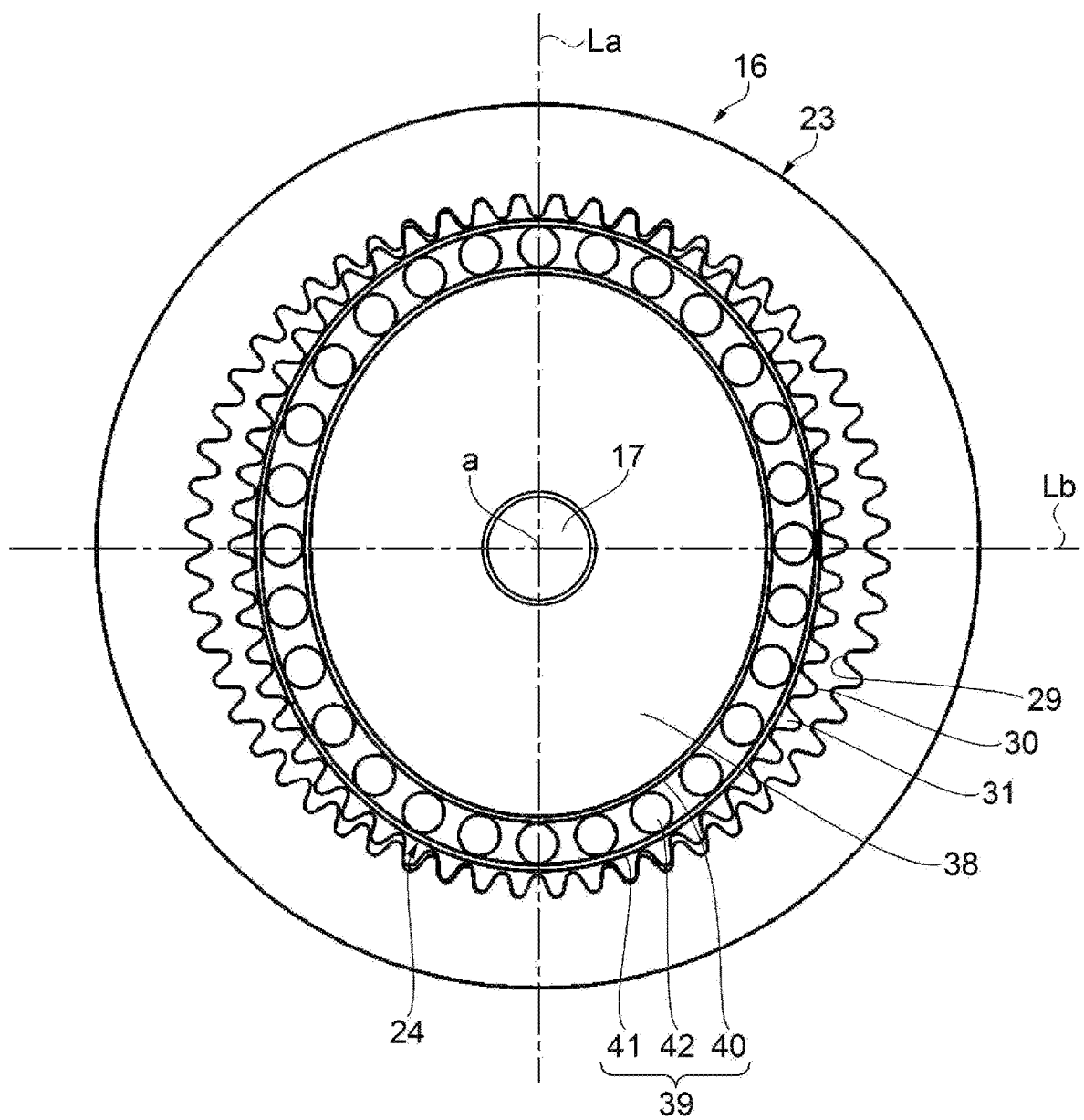
FIG. 4 is a sectional view showing details of a gear section of a speed reducer according to the embodiment.

FIG. 2 is a sectional view of the first driving device 4 according to this embodiment and shows a cross section passing the first axis J1 and parallel to an XZ plane. FIG. 3 is a perspective view of the first driving device 4 according to this embodiment. FIG. 4 is a sectional view showing details of a gear section of a speed reducer 16 according to this embodiment and shows a cross section parallel to an XY plane. In the figures, for convenience of explanation, dimensions of sections are exaggerated and shown according to necessity. Dimension ratios among the sections and actual dimension ratios do not always coincide.

The first driving device 4 includes a motor 14, a supporting member 15, and the speed reducer 16.

The supporting member 15 includes a motor supporting section 26 functioning as a first supporting section, which is a part that supports the motor 14, a speed-reducer supporting section 27 functioning as a second supporting section, which is a part that supports the speed reducer 16, and a base attachment section 28 functioning as a third supporting section which is a part for attaching the first driving device 4 to a housing of the base 2. These sections are integrally configured by one component. The housing of the base 2 is equivalent to the external housing.

The motor 14 generates a driving force. The motor 14 is not particularly limited. However, a servomotor such as an AC servomotor or a DC servomotor is preferable.

The motor 14 includes a rotating shaft 17, a bearing 18, a bearing 19, a first case 20, a second case 21, and a rotation detector 22.

The bearing 18 and the bearing 19 are rolling bearings including inner rings and outer rings. Both end portions of the rotating shaft 17 are fixed to the inner ring of the bearing 18 and the inner ring of the bearing 19 by tight fitting. The outer ring of the bearing 18 is supported by the motor supporting section 26 of the supporting member 15. The outer ring of the bearing 19 is supported by the first case 20. The first case 20 is fixed to the supporting member 15 via the second case 21.

In such a motor 14, the rotating shaft 17 is supported by the supporting member 15 via the bearing 18 and the bearing 19 and rotates around an axis "a" on the first axis J1 with respect to the supporting member 15. The rotating shaft 17 is coupled to the rotation detector 22, which detects the rotation of the rotating shaft 17, at a "b" end, which is an end portion on the bearing 19 side. The rotating shaft 17 is coupled to the speed reducer 16 at a "c" end, which is an end portion on the bearing 18 side, and transmits a driving force to the speed reducer 16.

The speed reducer 16 is a speed reducer by a wave gear mechanism called a wave gear speed reducer. The speed reducer 16 reduces the speed of rotation by the driving force input from the rotating shaft 17 and outputs the rotation. At the output side, torque proportional to a reduction ratio can be obtained.

As shown in FIGS. 2 to 4, the speed reducer 16 includes a rigid gear 23 functioning as the internal gear, a flexible gear 24 functioning as the flexible external gear, and a wave motion generator 25.

The rigid gear 23 is a gear configured by a rigid body, which substantially does not bend in the radial direction of the axis "a", and is a ring-like internal gear including internal teeth 29. In this embodiment, the rigid gear 23 is a spur gear. That is, the internal teeth 29 include a tooth trace parallel to the axis "a". The tooth trace of the internal teeth 29 may be inclined with respect to the axis "a". That is, the rigid gear 23 may be a helical gear or a double helical gear.

The rigid gear 23 is fixed to the speed-reducer supporting section 27 of the supporting member 15.

The flexible gear 24 is inserted through the inner side of the rigid gear 23. The flexible gear 24 is a gear including a flexible tubular section 31 deflectedly deformable in the radial direction of the axis "a" and is an external gear including external teeth 30 that mesh with the internal teeth 29 of the rigid gear 23. The number of teeth of the flexible gear 24 is less than the number of teeth of the rigid gear 23.

The flexible gear 24 has a silk hat shape including, in addition to the tubular section 31, a brim section 32 extending from one end of the tubular section 31 to the radial direction outer side of the axis "a". The external teeth 30 is formed on the axis "a" radial direction outer side at the other end portion of the tubular section 31.

The wave motion generator 25 includes a wave-motion generating section 33, a projecting section 34, and a fixing section 35.

The projecting section 34 is a circular pipe-shape part projecting perpendicularly from the center of the wave-motion generating section 33, that is, along the rotating shaft 17. The wave-motion generating section 33 and the projecting section 34 are integrally configured by one component. A fitting section 36 fit in the bearing 18 is formed on the distal end side of the projecting section 34. A thick section 37 thicker than the fitting section 36 in the radial direction of the axis "a", that is, a direction perpendicular to the rotating shaft 17 is formed on the root side of the projecting section 34, that is, the outer side of the fitting section 36 coupled to the bearing 18. That is, the thickness in the direction perpendicular to the rotating shaft 17 is larger in the thick section 37 than in the fitting section 36 coupled to the bearing 18.

The fitting section 36 is coupled to the inner ring of the bearing 18 of the motor 14 by tight fitting. Consequently, the wave motion generator 25 is coupled to the rotating shaft 17. At this time, the distal end of the fitting section 36, that is, the distal end of the projecting section 34 is preferably in contact with the rotating shaft 17 at the inner side of the inner ring of the bearing 18. The tight fitting is "interference fitting" described in JIS B 0401-1:2016. That is, when a hole and a shaft are fit with each other, a tightening margin is always formed between the hole and the shaft. That is, an allowable size of an upper part of the hole is equal to or smaller than an allowable size of a lower part of the shaft.

The fixing section 35 is configured by, for example, a screw or a bolt and fixes the wave-motion generating section 33 and the rotating shaft 17 of the motor 14 from the radial direction of the axis "a".

The wave-motion generating section 33 includes a main body section 38 and a bearing 39 attached to the outer circumference of the main body section 38.

The outer circumference of the main body section 38 is formed in an elliptical shape or an oval shape when viewed from the axial direction of the axis "a".

The bearing 39 is a rolling bearing including a flexible inner ring 40 and a flexible outer ring 41 and a plurality of balls 42 disposed between the inner ring 40 and the outer ring 41. The inner ring 40 is fit in the outer circumference of the main body section 38 and is elastically deformed in an elliptical shape or an oval shape along the outer circumferential surface of the main body section 38. According to the elastic deformation of the inner ring 40, the outer ring 41 is also elastically deformed in an elliptical shape or an oval shape. The outer circumferential surface of the inner ring 40 and the inner circumferential surface of the outer ring 41 are respectively formed as track surfaces for rolling the plurality of balls 42 while guiding the plurality of balls 42 along the circumferential direction. The plurality of balls 42 are held by a not-shown holder to keep intervals in the circumferential direction among the plurality of balls 42 constant.

The wave motion generator 25 is inserted through the inner side of the flexible gear 24 and is capable of rotating around the axis "a". The wave-motion generating section 33 comes into contact with the inner circumferential surface of the tubular section 31 of the flexible gear 24, bends the tubular section 31 in an elliptical shape or an oval shape having a major axis La and a minor axis Lb, and partially meshes the external teeth 30 with the internal teeth 29 of the rigid gear 23. The flexible gear 24 and the rigid gear 23 are meshed with each other on the inside and the outside to be capable of rotating around the axis "a".

In such a speed reducer 16, when a driving force from the motor 14 explained above is input to the wave motion generator 25, the rigid gear 23 and the flexible gear 24 relatively rotate around the axis "a" because of a number of teeth difference while a meshing position of the rigid gear 23 and the flexible gear 24 moves in the circumferential direction. Consequently, the speed of the rotation by the driving force input from the rotating shaft 17 of the motor 14, which is a driving source, to the wave motion generator 25 is reduced and the rotation is output from the flexible gear 24. At the output side, torque proportional to a reduction ratio can be obtained. That is, it is possible to realize a speed reducer including the wave motion generator 25 on the input side and including the flexible gear 24 at the output side.

An example of a method of assembling the first driving device 4 in this embodiment is briefly explained. However, explanation is omitted about assembly of the motor 14. Order of the assembly is not limited to order explained below.

First, the motor 14 is assembled to the supporting member 15. At this time, the second case 21 of the motor 14 comes into contact with the supporting member 15. The outer ring of the bearing 18, the inner ring of which is fixed to the rotating shaft 17 of the motor 14 by tight fitting in advance, is supported by the motor supporting section 26. The outer ring of the bearing 18 is desirably directly or indirectly fixed to the motor supporting section 26. A fixing method is not particularly limited. Examples of the fixing method include an adhesive, welding, press fitting, cold fitting, and shrink fitting. However, the outer ring of the bearing 18 may not be completely fixed if movement in the radial direction of the axis "a" is restricted by loose fitting or the like and movement in the axial direction of the axis "a" is restricted by preload by a spring or the like with respect to the motor supporting section 26.

Subsequently, the wave motion generator 25 is assembled to the inner ring of the bearing 18 of the motor 14 by tight fitting. At this time, the distal end of the projecting section 34 of the wave motion generator 25 preferably comes into contact with the rotating shaft 17 at the inner side of the inner ring of the bearing 18. An assembly method by the tight fitting is not particularly limited. Examples of the assembly method include press fitting, cold fitting, and shrink fitting.

Subsequently, the wave motion generator 25 and the rotating shaft 17 of the motor 14 are fixed from the radial direction of the axis "a" by the fixing section 35. A fixing method is not particularly limited. However, the fixing method may be fixing by an adhesive, welding, or the like other than the fixing by the screw or the bolt.

Subsequently, the flexible gear 24 is turnably assembled to the rigid gear 23. An assembly method is not particularly limited. Examples of the assembly method include assembly by a screw or a bolt in the brim section 32, an adhesive, or welding.

Subsequently, the rigid gear 23 is assembled to the speed-reducer supporting section 27 of the supporting member 15. An assembly method is not particularly limited. Examples of the assembly method include fixing by a screw or a bolt, an adhesive, welding, press fitting, cold fitting, and shrink fitting.

As explained above, the first driving device 4 is completed.

According to this embodiment, the following effects can be obtained.

According to this embodiment, since the rotating shaft 17 and the projecting section 34 of the wave motion generator 25 are coupled to the inner ring of the bearing 18 by tight fitting, coaxial accuracy of the wave motion generator 25 with respect to the rotating shaft 17 is improved. A reduction in the mechanical life of the speed reducer 16 can be suppressed.

According to this embodiment, since the distal end of the projecting section 34 is in contact with the rotating shaft 17 at the inner side of the inner ring of the bearing 18, the wave motion generator 25 can be more stably coupled to the inner ring of the bearing 18 and the rotating shaft 17. Therefore, assembly accuracy with respect to a tilt is improved. A reduction in the mechanical life of the speed reducer 16 can be suppressed. Further, since an area of contact of the rotating shaft 17 and the wave motion generator 25 with the inner ring of the bearing 18 increases, it is easy to allow frictional heat generated in the bearing 18 to escape to peripheral components. A reduction in the life of the bearing 18 can be suppressed.

According to this embodiment, the motor supporting section 26, which supports the motor 14 via the bearing 18, and the speed-reducer supporting section 27, which fixes the rigid gear 23, are integrally configured by one component as the supporting member 15. Therefore, the coaxial accuracy of the rigid gear 23 with respect to the wave motion generator 25 is further improved. The reduction in the mechanical life of the speed reducer 16 can be further suppressed.

According to this embodiment, since the motor supporting section 26, the speed-reducer supporting section 27, and the base attachment section 28 are integrally configured by one component as the supporting member 15, the first driving device 4 can be directly fixed to the base 2 not via other components.

According to this embodiment, since the thick section 37 is provided in the root of the projecting section 34 with respect to the wave-motion generating section 33, the strength of the projecting section 34 can be improved.

The embodiment may be changed as explained below.

In the embodiment, the thick section 37 is not in contact with the bearing 18. However, not only this, but the thick section 37 may be in contact with the bearing 18. In this case, since the wave motion generator 25 can be more stably coupled to the bearing 18, assembly accuracy with respect to a tilt is improved. A reduction in the mechanical life of the speed reducer 16 can be suppressed. Further, since a contact area of the wave motion generator 25 and the bearing 18 increases, it is easy to allow frictional heat generated in the bearing 18 to escape to peripheral components. A reduction in the life of the bearing 18 can be suppressed.

In the embodiment, the flexible gear 24 has the silk hat shape. However, not only this, but the flexible gear 24 may have a cup shape formed by, for example, closing one end of the tubular section 31 in a bottom shape of a cup.

In the embodiment, the robot 1 is the SCARA robot. However, not only this, but the robot 1 may be, for example, a vertical articulated robot. Further, the first driving device 4 may be incorporated in an apparatus other than the robot.

In the embodiment, the supporting member 15 includes the motor supporting section 26, the speed-reducer supporting section 27, and the base attachment section 28 and these sections are integrally configured by one component. However, not only this, but, for example, the motor supporting section 26, the speed-reducer supporting section 27, and the base attachment section 28 may be respectively configured by separate components and fastened by a screw, a bolt, or the like.

In the embodiment, the wave motion generator 25 and the rotating shaft 17 of the motor 14 are fixed from the radial direction of the axis "a" by the fixing section 35 of the wave motion generator 25. However, not only this, but, for example, the wave motion generator 25 and the rotating shaft 17 may be directly or indirectly fixed by a screw, a bolt, or the like from the axial direction of the axis "a". A fixing structure by the fixing section 35 may be absent if the inner ring of the bearing 18 and the wave motion generator 25 are fixed by tight fitting with force exceeding a driving force of the motor 14.

Contents derived from the embodiment are described below.

A driving device is a driving device including: a motor including a rotating shaft; a wave gear speed reducer configured to reduce speed of rotation of the rotating shaft; and a supporting member configured to support the motor and the wave gear speed reducer. The wave gear speed reducer includes: an internal gear fixed to the supporting member; a flexible external gear configured to partially mesh with the internal gear; and a wave motion generator coupled to the rotating shaft and configured to come into contact with an inner circumferential surface of the external gear, bend the external gear, and move a meshing position of the internal gear and the external gear in a circumferential direction. The wave motion generator includes a projecting section projecting along the rotating shaft. The rotating shaft is supported by the supporting member via a bearing including an inner ring and an outer ring. The outer ring of the bearing is supported by the supporting member. The inner ring of the bearing and the rotating shaft are coupled by tight fitting. The inner ring of the bearing and the projecting section are coupled by tight fitting.

With this configuration, since the rotating shaft of the motor and the projecting section of the wave motion generator are coupled to the inner ring of the baring by the tight fitting, coaxial accuracy of the wave motion generator with respect to the rotating shaft is improved. A reduction in the mechanical life of the speed reducer can be suppressed.

In the driving device, a first supporting section for supporting the bearing and a second supporting section for fixing the internal gear may be integrally configured by one component in the supporting member.

With this configuration, since the first supporting section and the second supporting section are configured as one component, the coaxial accuracy of the internal gear with respect to the wave motion generator is further improved. The reduction in the mechanical life of the speed reducer can be further suppressed.

In the driving device, the first supporting section, the second supporting section, and a third supporting section attached to an external housing may be integrally configured by one component in the supporting member.

With this configuration, since the first supporting section, the second supporting section, and the third supporting section are configured as one component, the driving device can be directly fixed to the external housing.

In the driving device, a distal end of the projecting section may be in contact with the rotating shaft at an inner side of the inner ring of the bearing.

With this configuration, since the wave motion generator can be more stably coupled to the inner ring of the bearing and the rotating shaft of the motor, assembly accuracy with respect to a tilt is improved. A reduction in the mechanical life of the speed reducer can be suppressed. Since an area of contact of the rotating shaft and the wave motion generator with the inner ring of the bearing increases, it is easy to allow frictional heat generated in the bearing to escape to peripheral components. A reduction in the life of the bearing can be suppressed.

In the driving device, the projecting section may include, at an outer side of a portion coupled to the bearing, a thick section, thickness of which in a direction perpendicular to the rotating shaft is larger than thickness of a portion coupled to the bearing.

With this configuration, since the thick section is provided in a root of the projecting section of the wave motion generator, strength of the projecting section is improved.

In the driving device, the thick section may be in contact with the bearing.

With this configuration, since the wave motion generator can be more stably coupled to the bearing, assembly accuracy with respect to a tilt is improved. A reduction in the mechanical life of the speed reducer can be suppressed. Since a contact area of the wave motion generator and the bearing increases, it is easy to allow frictional heat generated in the bearing to escape to peripheral components. A reduction in the life of the bearing can be suppressed.

What is claimed is:

1. A driving device comprising:
   a motor including a rotating shaft;
   a wave gear speed reducer configured to reduce speed of rotation of the rotating shaft; and
   a supporting member configured to support the motor and the wave gear speed reducer, wherein
   the wave gear speed reducer includes:
   an internal gear fixed to the supporting member;
   a flexible external gear configured to partially mesh with the internal gear; and
   a wave motion generator coupled to the rotating shaft and configured to come into contact with an inner circumferential surface of the external gear, bend the external gear, and move a meshing position of the internal gear and the external gear in a circumferential direction,
   the wave motion generator includes a projecting section projecting along the rotating shaft,
   the rotating shaft is supported by the supporting member via a bearing including an inner ring and an outer ring, and
   the outer ring of the bearing is supported by the supporting member, the inner ring of the bearing and the rotating shaft are coupled by tight fitting, and the inner ring of the bearing and the projecting section are coupled by tight fitting,
   wherein the wave-motion generating section and the projecting section are integrally configured by one component,
   wherein the projecting section includes, at an outer side of a portion coupled to the bearing, a thick section, thickness of which in a direction perpendicular to the rotating shaft is larger than thickness of a portion coupled to the bearing, wherein the thick section is in contact with the bearing.

2. The driving device according to claim 1, wherein a first supporting section for supporting the bearing and a second supporting section for fixing the internal gear are integrally configured by one component in the supporting member.

3. The driving device according to claim 2, wherein the first supporting section, the second supporting section, and a third supporting section attached to an external housing are integrally configured by one component in the supporting member.

4. The driving device according to claim 1, wherein a distal end of the projecting section is in contact with the rotating shaft at an inner side of the inner ring of the bearing.

* * * * *